United States Patent
Kamiya

(10) Patent No.: US 10,464,388 B2
(45) Date of Patent: Nov. 5, 2019

(54) VEHICLE IN-WHEEL MOTOR SUSPENSION

(71) Applicant: HONDA MOTOR CO., LTD., Minato-ku, Tokyo (JP)

(72) Inventor: Toru Kamiya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/747,960

(22) PCT Filed: Jul. 11, 2016

(86) PCT No.: PCT/JP2016/070372
§ 371 (c)(1),
(2) Date: Jan. 26, 2018

(87) PCT Pub. No.: WO2017/018180
PCT Pub. Date: Feb. 2, 2017

(65) Prior Publication Data
US 2018/0222272 A1    Aug. 9, 2018

(30) Foreign Application Priority Data

Jul. 30, 2015 (JP) ................. 2015-150199

(51) Int. Cl.
*B60K 1/00* (2006.01)
*B60G 17/0165* (2006.01)
(Continued)

(52) U.S. Cl.
CPC ........... *B60G 17/0165* (2013.01); *B60G 3/20* (2013.01); *B60G 17/0157* (2013.01);
(Continued)

(58) Field of Classification Search
CPC ............ B60G 17/0165; B60G 17/0157; B60G 17/00; B60G 17/015; B60G 3/20;
(Continued)

(56) References Cited

U.S. PATENT DOCUMENTS 5,498,018 A * 3/1996 Wahl ......................... B60G 3/26
                                                280/124.146
7,287,611 B2 * 10/2007 Nagaya .................... B60G 3/01
                                                180/65.51
(Continued)

FOREIGN PATENT DOCUMENTS

DE   11 2007 000 565 T5   1/2009
JP        11-042918 A     2/1999
(Continued)

OTHER PUBLICATIONS

Office Action dated Apr. 27, 2018, issued in the corresponding German Patent Application No. 11 2016 003 440.7, with the English translation thereof.

*Primary Examiner* — James M Dolak
(74) *Attorney, Agent, or Firm* — Carrier Blackman & Associates, P.C.; William D. Blackman; Jospeh P. Carrier

(57) ABSTRACT

In a vehicle provided with an in-wheel motor disposed below a spring of a front wheel, an anti-dive angle of a front suspension is set to form an angle which is inclined towards an upper side of the vehicle with respect to a horizontal line drawn from a ground contact point of the front wheel to a rear side of the vehicle, and an arc-shaped trajectory of a wheel center resulting from displacement of the front suspension is set to be movable towards the upper side of the vehicle and towards the rear side of the vehicle.

2 Claims, 4 Drawing Sheets

(51) Int. Cl.
  *B60G 3/20* (2006.01)
  *B60G 17/015* (2006.01)
  *B60K 7/00* (2006.01)

(52) U.S. Cl.
  CPC ...... B60K 7/0007 (2013.01); *B60G 2200/142* (2013.01); *B60G 2200/464* (2013.01); *B60G 2300/50* (2013.01); *B60G 2800/014* (2013.01); *B60G 2800/16* (2013.01); *B60K 2007/0038* (2013.01)

(58) Field of Classification Search
  CPC ............... B60G 3/00; B60G 2200/142; B60G 2200/464; B60G 2200/14; B60G 2200/44; B60G 2200/46; B60G 2300/50; B60G 2400/051; B60G 2400/0514; B60G 2400/0516; B60G 2400/60; B60G 2400/61; B60G 2400/64; B60G 2800/16; B60G 2800/014; B60G 2800/019; B60G 2800/0192; B60K 7/00; B60K 7/0007; B60K 2007/0038
  See application file for complete search history.

(56) References Cited

U.S. PATENT DOCUMENTS

| | | | | |
|---|---|---|---|---|
| 7,537,071 | B2 * | 5/2009 | Kamiya | B60G 3/20 180/298 |
| 7,672,766 | B2 * | 3/2010 | Poilbout | B60G 3/04 701/37 |
| 7,712,561 | B2 * | 5/2010 | Niwa | B60K 7/0007 180/65.51 |
| 7,734,384 | B2 * | 6/2010 | Konopa | B60G 13/16 429/96 |
| 7,789,178 | B2 * | 9/2010 | Mizutani | B60G 3/20 180/65.51 |
| 7,849,945 | B2 * | 12/2010 | Ross, VII | B60G 3/20 180/197 |
| 7,926,822 | B2 * | 4/2011 | Ohletz | B60G 11/16 280/124.179 |
| 8,046,130 | B2 | 10/2011 | Takahara et al. | |
| 8,083,243 | B2 * | 12/2011 | Hamada | B60G 7/02 180/65.51 |
| 8,132,636 | B2 * | 3/2012 | Suzuki | B60K 7/0007 180/65.51 |
| 8,296,009 | B2 * | 10/2012 | Kajino | B60G 17/016 280/5.5 |
| 8,948,951 | B2 | 2/2015 | Kimura et al. | |
| 9,434,229 | B2 * | 9/2016 | Hilton | B60G 17/08 |
| 9,834,214 | B2 * | 12/2017 | Fukudome | B60G 7/02 |
| 9,914,348 | B2 * | 3/2018 | Koval | B60K 7/0007 |
| 10,286,954 | B2 * | 5/2019 | Klinger | B60G 17/0152 |
| 10,300,758 | B2 * | 5/2019 | Guest | B60G 17/016 |
| 10,300,759 | B2 * | 5/2019 | Andreasson | B60W 40/10 |
| 10,363,790 | B2 * | 7/2019 | Hoffmann | B60G 17/0165 |
| 10,369,854 | B2 * | 8/2019 | Klinger | B60G 7/006 |
| 2007/0272458 | A1 * | 11/2007 | Taniguchi | B60G 11/00 180/65.51 |
| 2009/0101424 | A1 | 4/2009 | Suzuki | |
| 2014/0284122 | A1 * | 9/2014 | Hirata | B60G 3/20 180/65.51 |

FOREIGN PATENT DOCUMENTS

| | | |
|---|---|---|
| JP | 2000-006626 A | 1/2000 |
| JP | 2008-201291 A | 9/2008 |
| JP | 2011-031739 A | 2/2011 |
| JP | 2014-184758 A | 10/2014 |

* cited by examiner

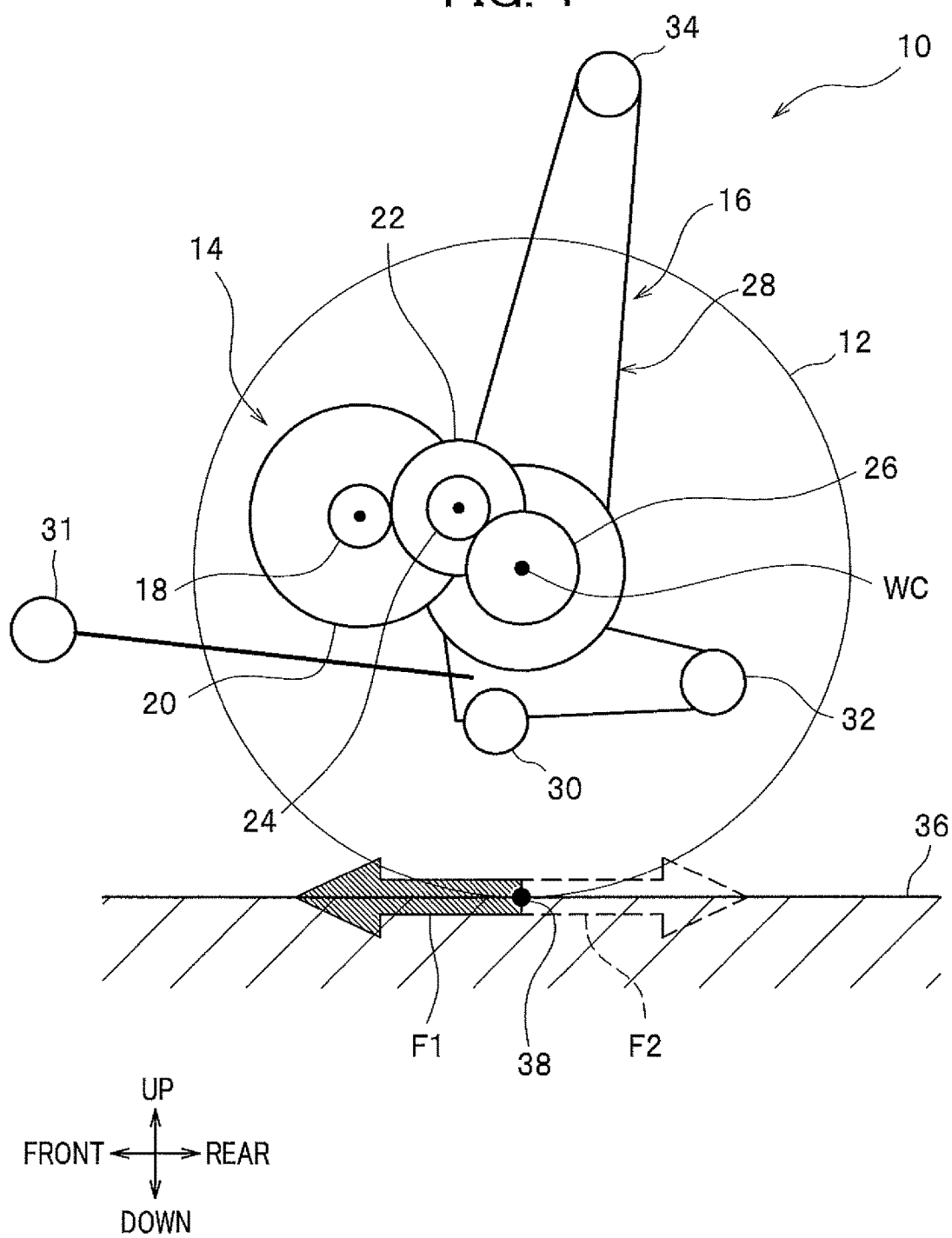

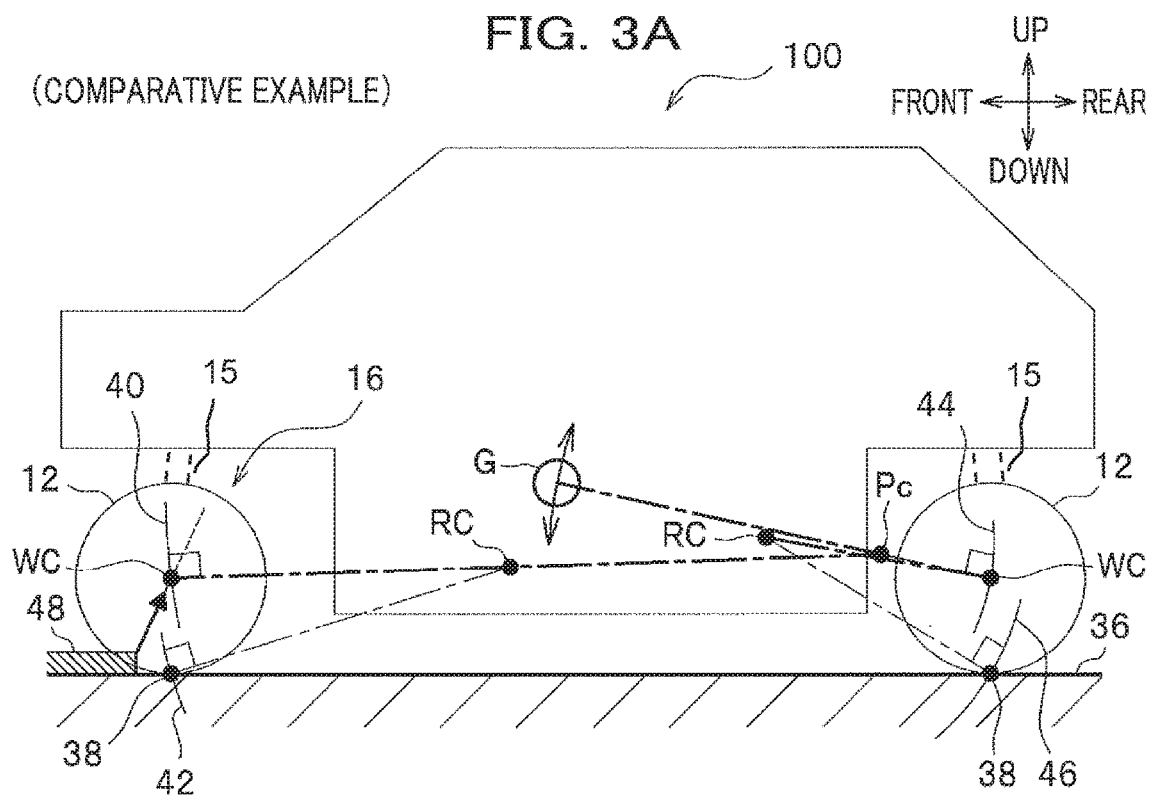
FIG. 3A (COMPARATIVE EXAMPLE)
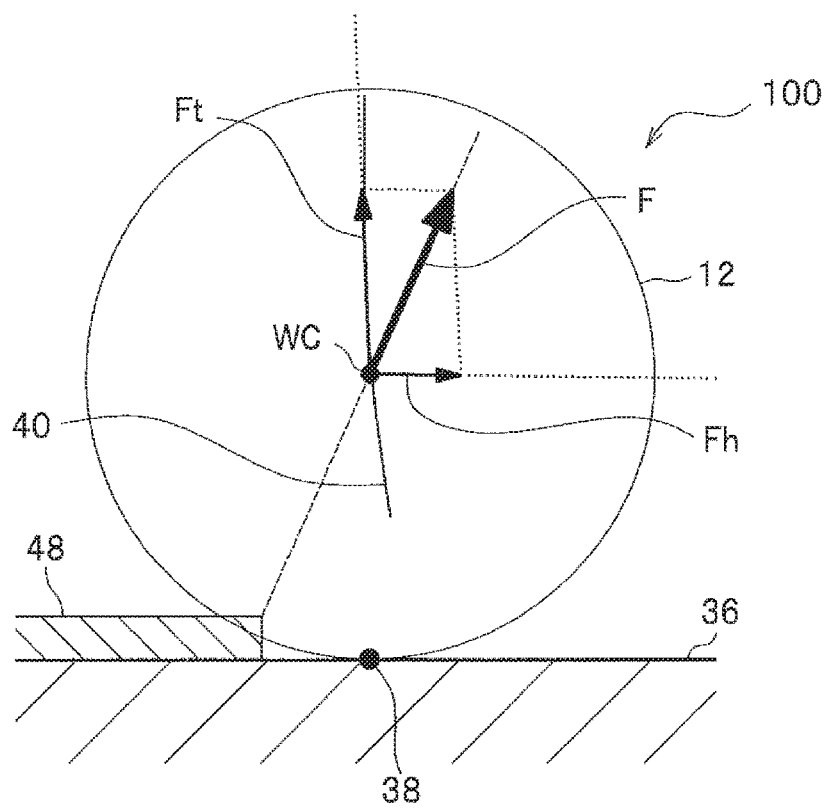
FIG. 3B

VEHICLE IN-WHEEL MOTOR SUSPENSION

TECHNICAL FIELD

The present invention relates to a vehicle provided with an in-wheel motor in a front wheel.

BACKGROUND ART

For example, in a vehicle having wheels, each of the wheels (Wheel Center; hereinafter referred to as WC) is generally displaced (stroked) upwards when riding over unevenness of a road surface. At that time, a suspension allows the wheel (wheel center) to be displaced rearwards by buffer action of a compliance bush, thereby absorbing shock applied to the wheel when riding over unevenness of the road surface.

A rear suspension is set to allow the entire wheel to be displaced (stroked) upwards and to be displaced rearwards by its mechanical operation, thereby absorbing shock applied to the wheel when riding over unevenness of the road surface, in addition to working of the compliance bush.

CITATION LIST

Patent Literature

Patent Literature 1: Japanese Unexamined Patent Application Publication No. 2014-184758

SUMMARY OF INVENTION

Technical Problem

Incidentally, a front suspension can be set to allow the wheel center (WC) to be displaced upwards and to be displaced rearwards as in the rear suspension described above. However, when the front suspension is set in this manner in an on-board engine, front-wheel drive vehicle having a drive source disposed above a spring and adapted to transmit torque through a drive shaft at least to a front wheel, fluctuation in a pitching angle of a vehicle body above the spring becomes large during acceleration due to the fact that an operating point of a driving force is generated at the wheel center (WC). As a result, there is a risk that ride comfort is deteriorated.

Moreover, for example, as disclosed in Patent Literature 1, a vehicle having the drive source disposed below the spring allows both an operating point of a driving force and an operating point of a braking force to be generated at a ground contact point of the wheel relative to a ground contact surface, unlike a vehicle having the drive source disposed above the spring. Consequently, a vehicle such as disclosed in Patent Literature 1 allows a pitching center point of the vehicle body above the spring to be generated at a point different from that in a vehicle having the drive source disposed above the spring. Therefore, when the same suspension setting as in a general vehicle is carried out, there is a risk that ride comfort is deteriorated.

It is therefore a general object of the present invention to provide a vehicle capable of enhancing ride comfort.

Solution to Problem

In order to achieve the above object, the present invention provides a vehicle including an in-wheel motor disposed below a spring of a front wheel, wherein an anti-dive angle ($\theta 1$) of a front suspension is set to form an angle which is inclined towards an upper side of the vehicle with respect to a horizontal line drawn from a ground contact point of the front wheel to a rear side of the vehicle, and a trajectory of a wheel center (WC) resulting from displacement of the front suspension is set to be movable towards the upper side of the vehicle and towards the rear side of the vehicle.

The vehicle according to the present invention allows the trajectory of the wheel center (WC) resulting from displacement of the front suspension to be set to be movable towards the upper side of the vehicle and towards the rear side of the vehicle, thereby making it possible, when an input load (F) is applied to the front wheel by a projection on a road surface, to allow a horizontal component force (Fh) of the input load (F) to become small, and to absorb shock applied to the wheel when riding over unevenness of the road surface, to enhance ride comfort. Note that the "anti-dive angle" means the angle ($\theta 1$) which is formed between a straight line that connects a ground contact point with a virtual rotation center (RC) for the ground contact point associated with displacement of the front suspension, and the horizontal line including the ground contact point.

Moreover, the vehicle according to the present invention is preferably configured so that a height of the virtual rotation center (RC) in a vertical direction is set to be higher than the ground contact point and to be equal to or less than a height of the wheel center (WC).

The vehicle according to the present invention allows the height of the virtual rotation center (RC) in the vertical direction to be set to be higher than the ground contact point and to be equal to or less than the height of the wheel center (WC), thereby making it possible to move the trajectory of the wheel center (WC) resulting from displacement of the front suspension towards the upper side of the vehicle and towards the rear side of the vehicle.

Furthermore, the vehicle according to the present invention is preferably configured so that a load applied to the front wheel by a projection on a road surface has a horizontal component force, and the horizontal component force is smaller than a horizontal component force which is generated in a front wheel in an (on-board engine, front-wheel drive) vehicle by the projection on the road surface, the vehicle having a drive source disposed above a spring and adapted to transmit torque through a drive shaft at least to the front wheel.

The vehicle according to the present invention makes it possible to reduce the horizontal component force (Fh) which is generated in the front wheel by the projection on the road surface, as compared to the on-board engine, front-wheel drive vehicle. This causes the vehicle according to the present invention to make it possible, when the input load (F) is applied to the front wheel by the projection on the road surface, to allow a force by which the vehicle body is tugged towards the rear side of the vehicle, to become small, and to absorb shock applied to the wheel when riding over unevenness of the road surface, to enhance ride comfort.

Advantageous Effects of Invention

The present invention makes it possible to obtain a vehicle capable of enhancing ride comfort.

BRIEF DESCRIPTION OF DRAWINGS

FIG. 1 is a partially enlarged side view of a vehicle according to an embodiment of the invention.

FIG. 3A is a schematic view of a vehicle according to a comparative example, and FIG. 3B is a schematic view showing, in the front wheel of the vehicle according to the comparative example shown in FIG. 3A, component forces of an input load applied to the front wheel from the projection.

DESCRIPTION OF EMBODIMENTS

Figure 2A:
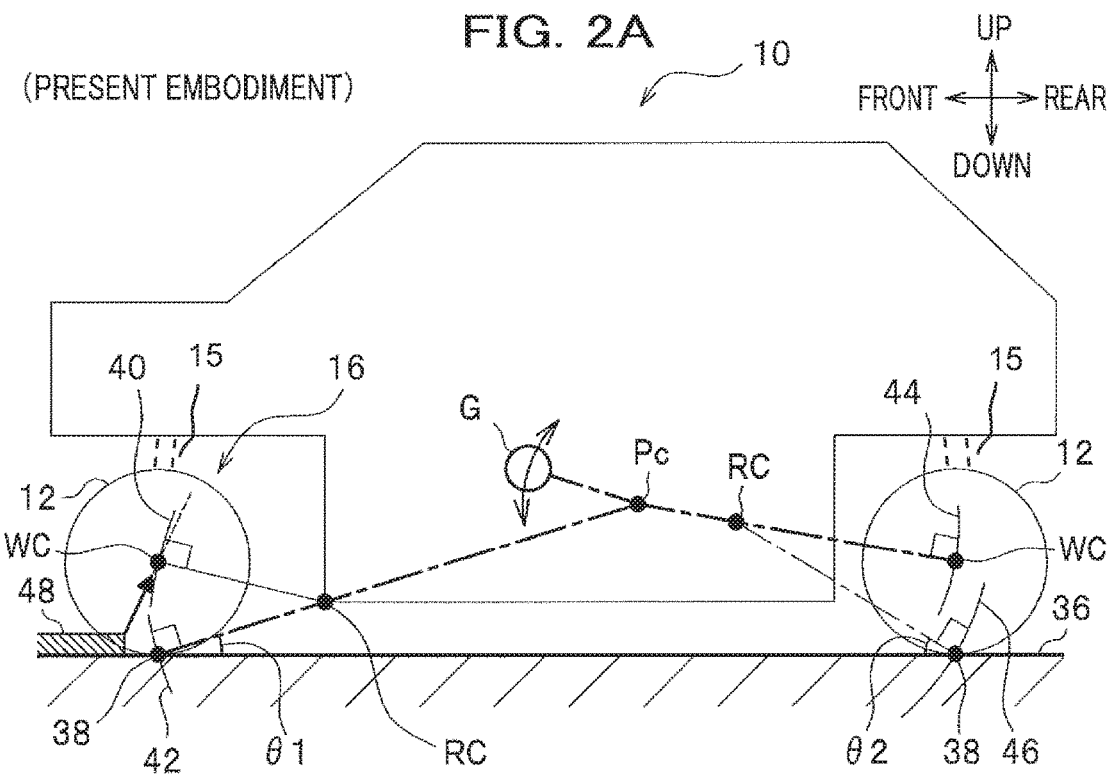
FIG. 2A is a schematic view of the vehicle shown in FIG. 1, which includes an in-wheel motor provided only at a front wheel.

Embodiments of the present invention will be hereinafter described in detail with reference to the drawings as appropriate. FIG. 1 is a partially enlarged side view of a vehicle according to an embodiment of the invention. Note that, in each figure of the drawings, "front-rear", "right-left", and "up-down" indicate a front-rear direction of the vehicle, a right-left direction of the vehicle (vehicle width direction), and a vertical up-down direction of the vehicle, respectively.

As shown in FIG. 1, a vehicle 10 according to the present embodiment is configured to include a wheel (front wheel) 12, an in-wheel motor 14, and a front suspension 16. Note that, although the vehicle 10 is provided with right and left wheels 12, 12, right and left in-wheel motors 14, 14, and right and left front suspensions 16, 16, respectively, only the components on the left side are illustrated and illustration of the components on the right side is omitted.

The in-wheel motor 14 is composed of an electric motor 20 having a motor shaft 18 and adapted to drive the wheel 12, and a transmission mechanism 22 adapted to transmit a driving force of the electric motor 20 to the wheel 12. The in-wheel motor 14 is disposed below a spring 15 of the wheel 12. The transmission mechanism 22 is adapted to transmit the driving force of the electric motor 20 through a transmission shaft 24 to an output shaft 26 of the wheel 12. The output shaft 26 has a wheel center (WC) of the wheel 12.

The front suspension 16 includes a knuckle 28 that rotatably and pivotably supports the wheel 12, and suspension arms (not shown) such as an upper arm and a lower arm. Moreover, a compliance bush 31 is disposed on the lower side than the wheel center (WC) of the wheel 12 and on the vehicle body side in the front of the vehicle. The knuckle 28 includes a lower arm joint 30 that is disposed nearly below the wheel center (WC) of the wheel 12, a tie rod joint 32 that is disposed on the lower side of the wheel center (WC) of the wheel 12 and on the rearer side of the vehicle than the lower arm joint 30, and an upper arm joint 34 that is disposed nearly above the wheel center (WC) of the wheel 12.

The compliance bush 31 consists of, e.g., a vibration-proof bush, and is composed of an inner cylinder and an outer cylinder, and a cylindrical rubber elastic body that is sandwiched between the inner cylinder and the outer cylinder. The compliance bush 31 is adapted to absorb force applied thereto in the front-rear direction of the vehicle to enhance front-rear compliance (elastic force).

The vehicle 10 according to the present embodiment allows the in-wheel motor 14 to be disposed below the spring 15, thus allowing an operating point of a driving force (F1) transmitted from the in-wheel motor 14 to be generated at a ground contact point 38 of the wheel 12 relative to a road surface 36 (see FIG. 1). Moreover, an operating point of a braking force (F2) is identical to the operating point of the driving force (F1) and generated at the ground contact point 38 of the wheel 12 relative to the road surface 36. Note that directions of the driving force (F1) and the braking force (F2) are in directions opposite to each other.

Therefore, the vehicle 10 according to the present embodiment allows the operating point of the driving force (F1) and the operating point of the braking force (F2) to be identical to each other at the ground contact point 38, and thus description will be given below, using an anti-dive angle ($\theta 1$) and an anti-lift angle ($\theta 2$) in the anti-dive geometry.

Moreover, the vehicle 10 to which the present embodiment is applied is applied to a front-wheel drive vehicle or a four-wheel drive vehicle that is provided with the in-wheel motor 14 at the right and left front wheels 12, respectively. The vehicle 10 is not necessarily limited to a four-wheel vehicle and may be, for example, a six-wheel vehicle (which is provided with an in-wheel motor in the most forward front wheel of the vehicle).

While on the other hand, as shown in FIG. 3A to be described later, a vehicle 100 according to a comparative example having a drive source (engine) provided above the spring (an on-board engine, front-wheel drive vehicle, or an on-board engine, four-wheel drive vehicle) allows the operating point of the driving force to be generated at the wheel center (WC) of the front wheel 12.

Figure 2B:
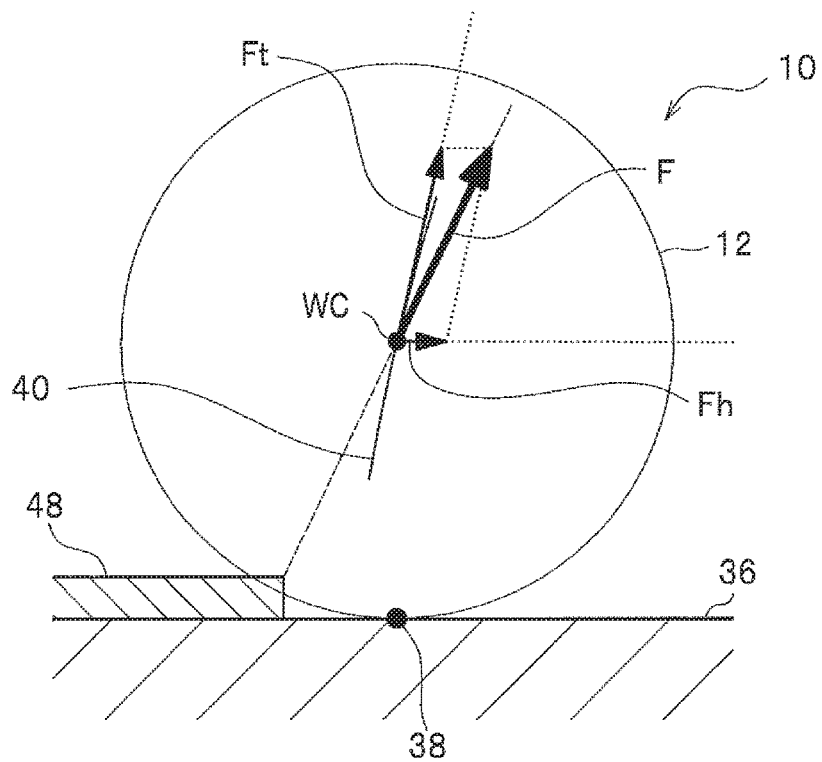
FIG. 2B is a schematic view showing, in the front wheel of the vehicle shown in FIG. 1, component forces of an input load applied to the front wheel from a projection.

FIG. 2A is a schematic view of the vehicle shown in FIG. 1, which includes the in-wheel motor provided only at the front wheel, and FIG. 2B is a schematic view showing, in the front wheel of the vehicle shown in FIG. 1, component forces of an input load applied to the front wheel from a projection. Note that in FIG. 2A and FIG. 2B, description is given with the wheel 12 separated into the front wheel 12 and the rear wheel 12, respectively, and the component common to the front wheel 12 and the rear wheel 12 is given the same reference sign.

In FIG. 2A, the wheel center (WC) of the front wheel 12 and the front ground contact point 38 are provided to freely revolve by a predetermined angle around a front virtual rotation center (RC: Rotation Center) that is positioned at the lowermost end of the vehicle body and on the front side of the vehicle. Displacement (stroke) of the front suspension 16 causes an arc-shaped trajectory 40 (see FIG. 2A and FIG. 2B) of the wheel center (WC) of the front wheel 12 to be formed, and an arc-shaped trajectory 42 (see FIG. 2A) of the front ground contact point 38 to be formed. A pitching center point (Pc) of the vehicle body above the spring is provided on an extended line that connects the front ground contact point 38 with the front virtual rotation center (RC). Moreover, a reference sign G denotes the center of gravity of the vehicle body above the spring.

Moreover, in the front wheel 12, the anti-dive angle ($\theta 1$) of the front suspension 16 is set to form an angle which is inclined towards the upper side of the vehicle with respect to a horizontal line (identical to a straight line along the road surface 36) drawn from the ground contact point 38 of the front wheel 12 to the rear side of the vehicle. Note that the "anti-dive angle" means the angle ($\theta 1$) which is formed between the straight line that connects the ground contact point 38 with the virtual rotation center (RC) for the ground contact point 38 associated with displacement of the front suspension 16, and the horizontal line including the ground contact point 38. In the rear wheel 12, the anti-lift angle ($\theta 2$)

of the rear suspension 16 is set to form an angle which is inclined towards the upper side of the vehicle with respect to the horizontal line drawn from the ground contact point 38 of the rear wheel 12 to the front side of the vehicle.

Furthermore, the arc-shaped trajectory 40 of the wheel center (WC) of the front wheel 12 due to displacement (stroke) of the front suspension 16 is set to extend towards the upper side of the vehicle and towards the rear side of the vehicle as it moves from the lower side to the upper side, as shown in FIG. 2B. In other words, the extension direction of the arc-shaped trajectory 40 of the wheel center (WC) formed by the displacement of the front suspension 16 is set to allow the trajectory 40 to move in an arc-shaped manner, not in the direction right above and in the front direction of the vehicle, but towards the upper side of the vehicle and towards the rear side of the vehicle.

On the other hand, the wheel center (WC) of the rear wheel 12 and the rear ground contact point 38 are provided to freely revolve by a predetermined angle around a rear virtual rotation center (RC) that is disposed at the rear side of the vehicle body. Displacement (stroke) of the rear suspension causes an arc-shaped trajectory 44 of the wheel center (WC) of the rear wheel 12 to be formed, and an arc-shaped trajectory 46 of the rear ground contact point 38 to be formed. The pitching center point (Pc) of the vehicle body above the spring is provided on an extended line that connects the wheel center (WC) of the rear wheel 12 with the rear virtual rotation center (RC).

The vehicle 10 according to the present embodiment is basically configured as described above, and operation and effects caused by the vehicle 10 according to the present embodiment will be described below while comparing the vehicle 10 with the vehicle 100 according to the comparative example.

FIG. 3A is a schematic view of a vehicle according to the comparative example, and FIG. 3B is a schematic view showing, in the front wheel of the vehicle according to the comparative example shown in FIG. 3A, component forces of an input load applied to the front wheel from the projection. Note that the comparative example will be described below with the same reference sign being given to the same component as in the present embodiment.

The vehicle 100 according to the comparative example is an on-board engine, front-wheel drive vehicle in which a drive source is disposed above a spring.

The vehicle 100 according to the comparative example allows the drive source (engine) to be disposed above the spring, thus allowing the operating point of the driving force (F1) to be generated at the wheel center (WC) of the front wheel 12, and in this respect, differs from the vehicle 10 according to the present embodiment which allows the operating point of the driving force (F1) to be generated at the ground contact point 38. The vehicle 100 according to the comparative example also allows the front virtual rotation center (RC) to be disposed at a position above the lowermost end of the vehicle body and near the center of the vehicle body. Moreover, the vehicle 100 according to the comparative example allows the pitching center point (Pc) of the vehicle body above the spring to be located at the rear side of the vehicle body. Furthermore, the vehicle 100 according to the comparative example allows the arc-shaped trajectory 40 of the wheel center (WC) of the front wheel 12 to be formed to extend from the lower side in the direction nearly right above, as shown in FIG. 3B.

As shown in FIG. 2B and FIG. 3B, when the front wheel 12 rides over a projection 48 formed on the road surface 36, the projection 48 on the road surface 36 causes an input load (F) to be applied to the front wheel 12. In the vehicle 10 according to the present embodiment and the vehicle 100 according to the comparative example, the input load (F) is decomposed into a horizontal component force (Fh) and a component force (Ft) in a tangential direction of the trajectory of the wheel center.

In this case, as understood from comparison of the horizontal component force Fh generated in the vehicle 10 according to the present embodiment shown in FIG. 2B with the horizontal component force Fh generated in the vehicle 100 according to the comparative example shown in FIG. 3B, the horizontal component force Fh in the vehicle 10 according to the present embodiment becomes smaller than that in the vehicle 100 according to the comparative example. This causes the vehicle 10 according to the present embodiment to make it possible, when the input load (F) is applied to the front wheel 12 by the projection 48 on the road surface 36, to allow a force which tugs the vehicle body towards the rear side of the vehicle, to become small, and to absorb shock applied to the wheel when riding over unevenness of the road surface, to enhance ride comfort.

While on the other hand, the vehicle 100 according to the comparative example allows the horizontal component force Fh to be great as compared to the present embodiment, thus allowing shock received by a force which tugs the vehicle body towards the rear side of the vehicle, to become great, and allowing ride comfort obtained when riding over the projection 48, to be deteriorated. Note that spring rates of the front suspensions 16 in the present embodiment and the comparative example are set to be the same as each other.

Figure 4A:
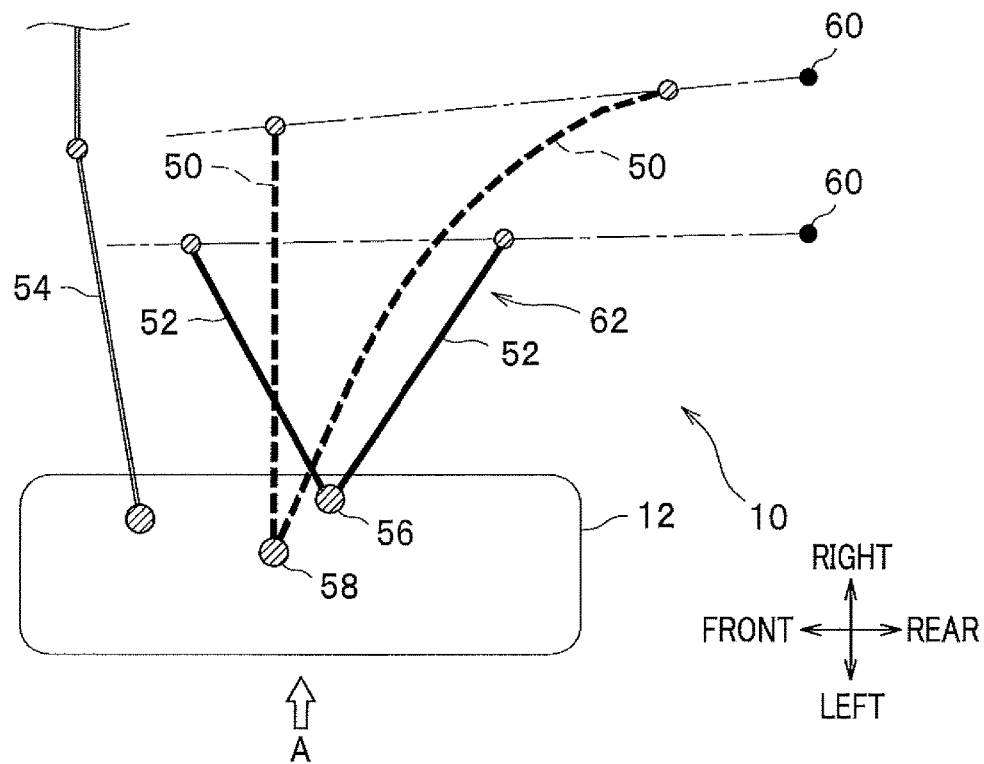
FIG. 4A is a planar schematic view of an example in which a double wishbone suspension is adopted as a front suspension of a left front wheel.

Next, description will be given of a concrete example of the front suspension 16 that enables the arc-shaped trajectory 40 of the wheel center (WC) to move towards the upper side of the vehicle and towards the rear side of the vehicle. FIG. 4A is a planar schematic view of an example in which a double wishbone suspension is adopted as a front suspension of a left front wheel, and FIG. 4B is a side perspective view taken in the direction of an arrow A shown in FIG. 4A.

Figure 4B:
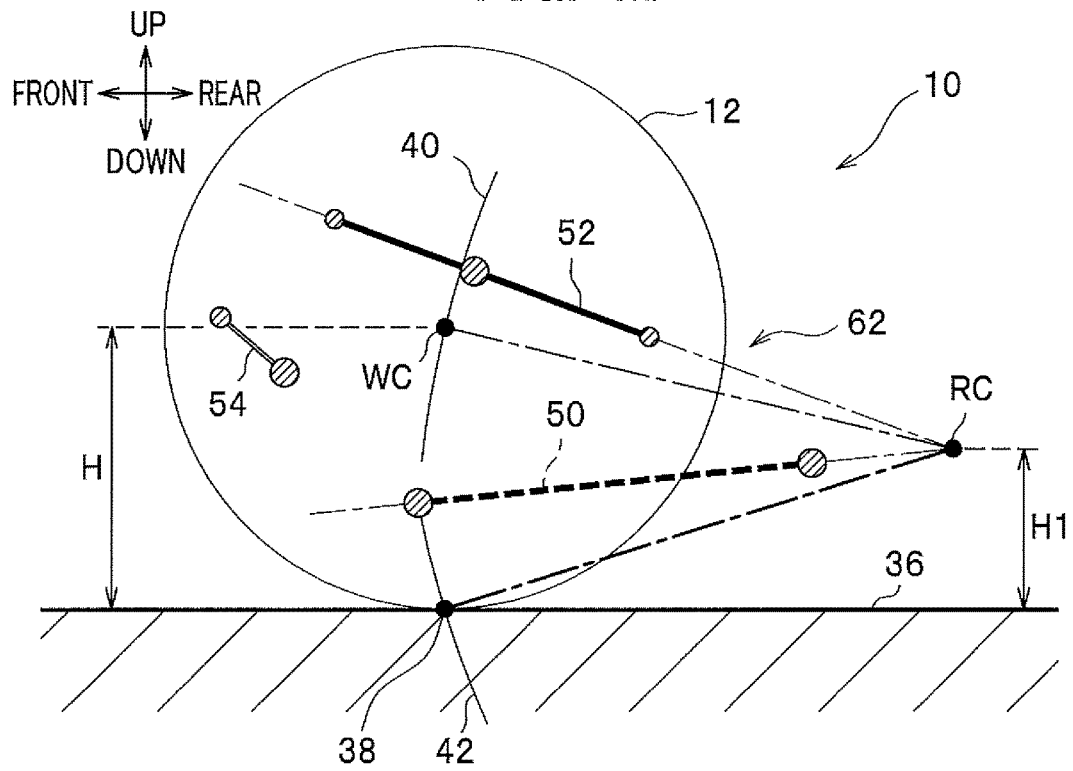
FIG. 4B is a side perspective view taken in the direction of an arrow A shown in FIG. 4A.

In FIG. 4A and FIG. 4B, a reference sign 50 denotes a lower arm; a reference sign 52 denotes an upper arm; a reference sign 54 denotes a tie rod; a reference sign 56 denotes an upper arm joint; and a reference sign 58 denotes a lower arm joint. Moreover, alternate long and short dashed lines 60 each denote a vehicle body (e.g., a sub frame).

As shown in FIG. 4B, a double wishbone suspension 62 is characterized in that, when viewed from the side of the vehicle body, a height (H1) in the vertical direction of the virtual rotation center (RC) for the wheel center (WC) and the ground contact point 38 is set to be higher than the ground contact point 38 and to be equal to or less than a height (H) of the wheel center (WC) (0<H1≤H).

In the vertical direction, the height (H1) of the virtual rotation center (RC) for the wheel center (WC) and the ground contact point 38 is set to be equal to or less than the height (H) of the wheel center (WC), thereby making it possible, when the input load (F) is applied to the front wheel 12 by the projection 48 on the road surface 36, to allow the force (horizontal component force Fh) which tugs the vehicle body towards the rear side of the vehicle, to become small, and to absorb shock applied to the wheel when riding over unevenness of the road surface, to enhance ride comfort.

Note that, although description has been given of the example in which the double wishbone suspension 62 is used as the front suspension 16 which is applicable, the present invention is not limited to this example, and for example, may be applied to a multilink suspension.

The vehicle 10 according to the present embodiment allows the arc-shaped trajectory 40 of the wheel center (WC) resulting from displacement of the front suspension 16 to be set to be movable towards the upper side of the vehicle and towards the rear side of the vehicle, thereby making it possible, when the input load (F) is applied to the front wheel 12 by the projection 48 on the road surface 36, to allow the horizontal component force (Fh) of the input load (F) to become small, and to absorb shock applied to the wheel when riding over unevenness of the road surface, to enhance ride comfort.

Moreover, the vehicle 10 according to the present embodiment allows the height (H1) of the virtual rotation center (RC) in the vertical direction to be set to be higher than the ground contact point 38 and to be equal to or less than the height (H) of the wheel center (WC), thereby making it possible to move the arc-shaped trajectory 40 of the wheel center (WC) resulting from displacement of the front suspension 16 towards the upper side of the vehicle and towards the rear side of the vehicle.

Furthermore, the vehicle 10 according to the present embodiment makes it possible to reduce the horizontal component force (Fh) which is generated in the front wheel 12 by the projection 48 on the road surface 36, as compared to the vehicle 100 according to the comparative example having the drive source above the spring of the front suspension 16 (see FIG. 2B and FIG. 3B). This causes the vehicle 10 according to the present embodiment to make it possible, when the input load (F) is applied to the front wheel by the projection 48 on the road surface 36, to allow a force by which the vehicle body is tugged towards the rear side of the vehicle, to become small, and to absorb shock applied to the wheel when riding over unevenness of the road surface, to enhance ride comfort.

REFERENCE SIGNS LIST

10 Vehicle
12 Wheel (Front wheel)
14 In-wheel motor
16 Front suspension
36 Road surface
38 Ground contact point
40 Arc-shaped trajectory (Trajectory of wheel center)
48 Projection
WC Wheel center
RC Virtual rotation center
θ1 Anti-dive angle
F Input load
Fh Horizontal component force

The invention claimed is:

1. A vehicle comprising a front wheel, a front suspension coupled to the front wheel, and an in-wheel motor disposed below a spring engaged with the front suspension, wherein
the front suspension is set to define an anti-dive angle which is formed between a straight line that connects a ground contact point of the front wheel with a virtual rotation center (RC) for the ground contact point associated with displacement of the front suspension, and a horizontal line including the ground contact point, and
the front suspension is set to allow an arc-shaped trajectory of a wheel center from the displacement of the front suspension to move towards an upper side of the vehicle and towards a rear side of the vehicle, and wherein
the virtual rotation center is set at a height in a vertical direction that is higher than the ground contact point and equal to or less than a height of the wheel center.

2. The vehicle according to claim 1, wherein
a load applied to the front wheel by a projection on a road surface has a horizontal component force, and
the horizontal component force is smaller than a horizontal component force which would be generated in a front wheel of a comparative vehicle having an on-board engine and front-wheel drive by the projection on the road surface.

* * * * *